J. H. C. BOIG.
COTTON PICKER DEVICE.
APPLICATION FILED APR. 28, 1914.
1,253,774. Patented Jan. 15, 1918.
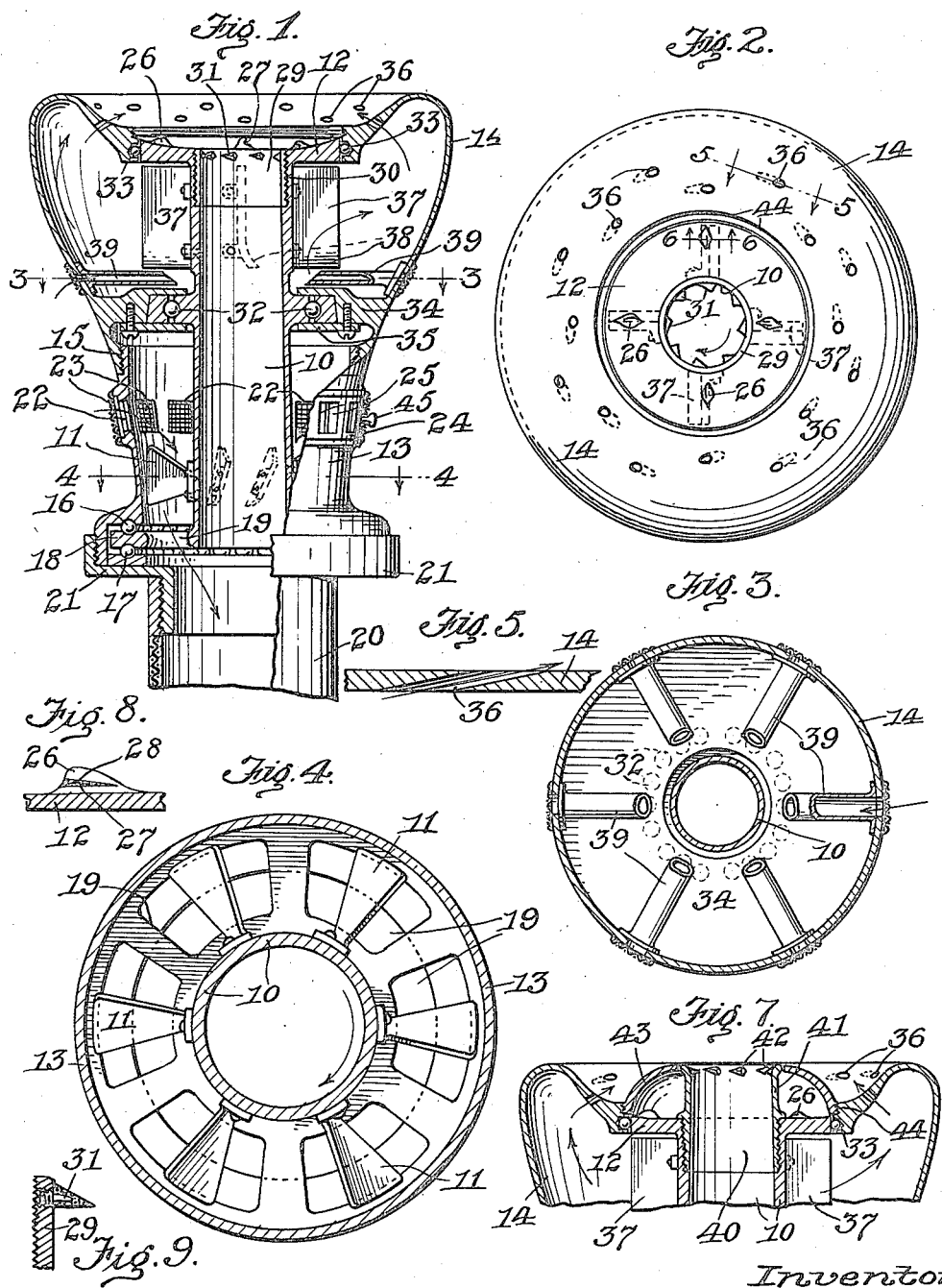
Witnesses.
E. R. Pollard
Mildred E. Glass
Inventor.
James H. C. Boig.
By
Cassell Severance,
Atty.

UNITED STATES PATENT OFFICE.

JAMES HENRY C. BOIG, OF LOS ANGELES, CALIFORNIA.

COTTON-PICKER DEVICE.

1,253,774.　　　　　Specification of Letters Patent.　　Patented Jan. 15, 1918.

Application filed April 28, 1914.　Serial No. 834,919.

*To all whom it may concern:*

Be it known that I, JAMES H. C. BOIG, a citizen of the United States, residing at Los Angeles, in the county of Los Angeles and State of California, have invented certain new and useful Improvements in Cotton-Picker Devices, of which the following is a specification.

This invention relates to improvements in cotton picking devices, and particularly to pneumatic cotton pickers, where a picking nozzle is employed through which the air is drawn for turning cotton loosening means and drawing in the cotton, so that it may be collected in any desired manner.

It is an object of the invention to provide a cotton picking device in which a picking nozzle tube is rotated by means of air drawn through the device, a portion of the air also being passed through the said nozzle tube to carry the cotton therewith, the device being provided with means for controlling the air which rotates the tube, whereby the tube may be rotated at greater or lesser speed as preferred.

It is also an object of the invention to provide a cotton picking nozzle mechanism which is formed with a suction-driven tube through which the cotton is drawn, the said tube also having fan vanes thereon which are engaged by the air drawn in by suction for rotating tube, the mechanism being also provided with air forcing means by which air may be directed in a manner to separate the dirt and cotton pods, or broken pieces thereof, from the cotton.

It is a further object of the invention to provide a suction cotton picker nozzle, with an inclosing casing having separated air compartments therein, one of said compartments being provided with inlet openings through which air may be drawn for operating the picking means, while the other compartment is provided with air inlet openings and also with air outlet openings through which the air may be directed for blowing dirt and foreign substances from the cotton as it is picked, means being provided in said latter compartment for driving the air out of the same.

With these and other objects in view the invention comprises certain other novel constructions, combinations and arrangements of parts, as will be hereinafter more fully described and claimed.

In the accompanying drawing forming a part of this specification:

Figure 1 is a longitudinal central sectional view through a cotton picker nozzle, constructed in accordance with the present invention, a portion of the casing being shown in side elevation.

Fig. 2 is an end elevation of the receiving portion of the picker mechanism.

Fig. 3 is a transverse sectional view through the nozzle mechanism, taken upon the line 3—3 of Fig. 1.

Fig. 4 is a transverse sectional view taken upon the line 4—4 of Fig. 1, the parts being shown upon an enlarged scale.

Fig. 5 is an enlarged detail sectional view taken upon the line 5—5 of Fig. 2.

Fig. 6 is an enlarged detail sectional view taken upon the line 6—6 of Fig. 2.

Fig. 7 is a central sectional view taken through the receiving end of the picker nozzle mechanism, adjustable parts being added thereto.

Fig. 8 is a fragmentary detail view showing one of the cotton engaging fingers with a rubber filling in the groove formed in the side thereof.

Fig. 9 is a fragmentary detail sectional view showing the manner of constructing some of the picker teeth when they are removably mounted in the nozzle.

The cotton picker device of the present invention is designed to afford a suction nozzle device which may be adapted to picking different kinds of cotton, the mechanism having adjustable parts so that when the southern short cotton is to be picked, a somewhat bowl shaped surface will be afforded at the receiving end of the nozzle, and when the Egyptian cotton and other similar species are to be picked, the receiving end of the nozzle may be equipped with projecting means adapted to be thrust among the stiff stalks of these kinds of cotton. The cotton picker device is also so constructed that at least a portion of the dirt, broken pod pieces and other foreign substances may be blown from the cotton as it is about to enter the nozzle and collections thereof prevented.

The details and features of the device will now be more specifically described, reference being had to the drawing, in which 10 indicates a nozzle tube, 11 a fan formed thereon, 12 a picker-head secured to the receiving end of the tube, while 13 and 14 indicate casing sections. The sections 13 and 14 are usually secured together by screw threaded portions 15 about midway of the length of the nozzle.

The lower end of the section 13 is increased in size sufficiently to receive ball bearings at 16 and 17 upon which the inner end of the nozzle tube 10 is movably supported. The inner end of said nozzle tube is formed with a ring portion 18 having suitable runways therein for engaging said ball bearings. Wide air openings 19 are formed in the ring portion 18 to permit of the passage of the air which engages the vanes of the fan 11. The casing 13 is connected with the end of a flexible tube 20 by means of an annular coupling 21 as clearly shown in Fig. 1 of the drawing. Said flexible pipe 20 extends to any suitable suction means, as for instance an air pump or fan, not shown in the drawing, the said pipe being of ample length to permit of the nozzle being moved from pod to pod within a considerable range of operation, in loosening and drawing in the cotton from their bolls.

The fan 11 is made up of any desired number of vanes or blades usually secured to the surface of the tube 10, the arrangement being such that the said fan is near the lower portion of the compartment within the casing section 13. The casing 13 is provided with a series of openings 22 to permit the entrance of the air necessary for driving fan 11 and thereby rotating the nozzle tube 10. The air will enter through said openings 22, because of the suction maintained in the flexible pipe 20 and will thus continually rotate the fan and picker nozzle tube 10. The openings 22 are preferably screened against the entrance of cotton or foreign substances, by means of a wire screening 23 mounted outside of casing 13 so as to cover all of said opening.

Since it is not always desired to drive the fan at a high rate of speed, and such as would be attained if the full head of the suction were permitted to affect the fan, a slide 24 having a knob 45 is mounted upon the outer surface of casing 13 in suitable guides, the said slide having a series of openings 25 adapted to be brought into coincidence with the openings 22. It will be evident that by moving said slide the openings for the inlet of air may be increased or diminished for controlling the speed with which the nozzle tube 10 is rotated.

The outer end of the nozzle picker tube 10 is provided with an outwardly extending flange forming a broad picker head 12 as clearly shown in Figs. 1, 2 and 7 of drawing. The outer surface of this head is generally provided with cotton engaging projections or teeth 26. The said projections are preferably elongated radially with respect to the picker head and are set at progressively greater distances from the tube 10 as shown in Fig. 2 of the drawing. By this arrangement the picker head is provided with means extending practically over all the rotating surface thereof in lines of travel, in engaging the cotton. These projections or fingers 26 are preferably formed with tapering grooves as at 27 in one of their sides as illustrated in Fig. 6. This groove is generally arranged in the sides of the projections or fingers which first engage the cotton, so that the grooves assist in taking hold of the cotton and insure the loosening of same from bolls. If desired the said grooves may be filled with rubber or other composition as shown at 28 in Fig. 8 of the drawing, the rubber being of sufficient softness to have somewhat of a clinging tendency when engaged by the cotton.

The inner surface of the nozzle tube 10, is also preferably provided with picker teeth or projections arranged near the receiving end of said tube. In order to adapt the device to use in harvesting different kinds of cotton, the said teeth are usually carried by a removable sleeve 29, which is provided with exterior screw-threads adapted to engage a screw-threaded recess 30, formed within the end of the nozzle tube 10. The teeth 31, carried by said sleeve 29, are preferably of a somewhat pyramidal form having their pointed portions however extended in the direction in which the nozzle tube 10, is turned, and also extending somewhat in an inwardly direction with respect to the tube as shown in Fig. 9, of drawing. These teeth 31, may be formed integral with the tube 10, or may be removably mounted therein as shown on an enlarged scale in Fig. 9. The said teeth may also be made either of metal or of rubber of more or less firm composition. Other materials, of course, may be used within the spirit and scope of the invention. The device when using the sleeve 31, is adapted for picking the southern short cotton, so called, and a smooth more or less concave surface is then desired upon the receiving end of the cotton picker mechanism, as disclosed in Figs. 1 and 2. Other forms of sleeves may be substituted for the sleeve 31, in adapting the mechanism to the picking of other kinds of cotton, as will be hereinafter more fully described.

The upper end of the nozzle tube 10, is incased in the upper casing section 14, and the said tube is provided with ball bearings at 32 and 33 as illustrated in Fig. 1. The bearings 32, are arranged near the central portion of the tube 10, and are supported in an inwardly extending partition flange 34, which is formed upon the casing section 14. The bearings 32, are also preferably covered by a plate 35, so as to prevent air from passing from one compartment in the casing to the other. The outer end of the casing 14, is flared outwardly and rounded, its outer edge being turned inwardly again to fit upon the peripheral edge of the picker head 12, the ball bearings at 33 being interposed between the adjacent edges of the parts.

Since there is usually some dirt and frequently broken pieces of pods entangled with the cotton, it is advisable to provide some means for separating at least some of these foreign materials from the cotton as it is being drawn into the picker nozzle, and also to prevent collections thereof on the picker device. For this purpose the nozzle section 14, is generally provided with air passages 36, so that air forced from within the said section 14, may be caused to pass out through the same and dislodge particles of dirt which are frequently carried by the cotton and are sometimes loosened by engagement with the end surface of the picker mechanism. In order not to blow the dirt toward the receiving end of the nozzle tube 10, the openings or passages 36, are usually set in inclined positions and so as to extend tangentially with respect to the said receiving end of the nozzle, as shown in Fig. 2, of the drawing.

In order to force air through said passages 36, fan blades 37, are arranged within the casing section 14, and secured to the nozzle tube 10, so that they will be carried around by the same. The lower ends of these blades 37, are preferably curved forwardly at 38, so as to give the air an upward direction. Air is supplied to the compartment in section 14, through a series of chutes 39, carried by the said casing section 14. Said chutes direct the air to points beneath the lower ends of the blades 37, as shown in the drawings. The rotation of the nozzle tube 10, will thus operate to force sufficient air through the passages 36, to cleanse the cotton of a considerable portion of the dirt and foreign materials which are frequently carried thereby. The chutes 39 are usually covered by screens.

When picking cotton like that commonly called the Egyptian and Durango cotton, and other species in which the stalks become large and strong and it is therefore necessary, in reaching some of the bolls to thrust the picker nozzle among the stalks and stems, it is desirable to use a somewhat different form of end structure upon the picker device. As shown in Fig. 7, the device of the present invention is readily adapted for picking cotton of this kind by removing the sleeve 29 and substituting therefor a sleeve 40, having an extended end portion 41 which projects a considerable distance beyond the end of the nozzle tube 10. The outer end of said projection 41 is provided with picker teeth 42 similar to the teeth 31 above described. The end of the nozzle mechanism is also provided with a curved collar 43 which is provided with screw threads upon its outer periphery adapted to engage screw threads formed upon an annular shoulder 44 on the outer face of section 14. The said collar 43 with the projection 41 afford an excellent means for facilitating the thrusting of the device into the cotton plants and among the stiff stems and stalks thereof. In this form of device, of course, the head 12 is covered and its projections or teeth 26 do not come in contact with the cotton. Otherwise the mechanism is the same as that above described and the operation of the device the same also. It will be evident, however, that a number of modifications and changes in form and in the mechanical details of the structure may be made without departing in the least from the spirit and scope of the present invention.

The operation of the device will be readily understood in connection with the above description. The tube or pipe 20 being first connected with a suitable suction mechanism, the outer end thereof with the picker nozzle is directed by the hand of the operator to the cotton in the bolls or pods. The air drawn inwardly will not only operate to suck the cotton through the nozzle tube 10, but that which enters through the openings 22 will rotate the fan 11 and thus produce the necessary rotation of the said nozzle tube 10. The fingers or projections 26 will engage the cotton sufficiently to pull the same loose from the bolls or pods, so that the air can more readily act upon the same. The air forced outwardly by the blades 37 will dislodge and separate a considerable portion of the dirt and other undesirable materials from the cotton preventing the same from entering with the cotton. In handling wet cotton, the teeth 31 or 42 may be removed, and also the sleeve 40 and the collar 43.

What is claimed is:

1. A cotton picker device comprising a suction driven rotatable nozzle adapted to receive cotton and means carried by the device for controlling the speed at which the nozzle is driven under the action of the suction.

2. A cotton picker device comprising a suction driven rotatable nozzle, a casing inclosing the same and means carried by said casing for controlling the amount of air permitted to affect the nozzle in turning the same, under the action of the suction.

3. A cotton picker device comprising a rotating picker tube having cotton engaging projections thereon, means for turning the tube under the action of a suction, a casing inclosing said tube and having air inlet openings for directing air to the tube turning means and a damper slide for controlling the amount of air which is permitted to impinge against said tube turning means under the action of the suction.

4. A cotton picker device comprising a rotatably mounted picker tube having cotton engaging projections at the outer end thereof, fan blades carried upon the outer surface of said tube, a casing inclosing the tube and having a series of screened openings in its wall for admitting air under suction to the blades for rotating the picker tube, a slide adapted to close or partially close the openings for controlling the entrance of air and the speed with which the picker tube will be driven, and means for connecting the device with pneumatic suction producing means.

5. A cotton picker device comprising a suction driven picker tube having an outwardly spreading rotatable picker head carried by the outer end thereof, cotton engaging projections upon the outer face of said picker head and extending radially thereof and means for rotating the tube under the action of a suction whereby the outwardly spreading picker head will also be turned.

6. A cotton picker device comprising a suction rotated picker tube, an inclosing casing therefor having compartments therein, vanes carried by said tube in one of said compartments, the casing having outlet openings for air, outside the entrance end of the picker tube, and having air inlet passages adjacent to the inner ends of said vanes, the structure being such that when the vanes are moved by the rotation of the picker tube, air will be forced outwardly through the outlet openings, and means for controlling the turning of the picker tube under the action of the suction.

7. A cotton picker device comprising a nozzle tube, a plurality of fans carried by said tube including a driving and a driven one, a casing inclosing said tube and fans, means for revolubly supporting the tube within said casing, means connected with a source of suction for operating said driving fan and rotating the tube, the rotation of said tube causing the driven fan to force air from the casing to separate dirt from the cotton and air inlet means for admitting air to said driven fan.

8. A cotton picker device comprising a casing having compartments therein, a nozzle tube revolubly mounted in said casing and having vanes forming a driving fan near one end extending into one of the compartments of the casing, means for directing air through said compartment for actuating said fan, the tube also having vanes in the other compartment of the casing forming a driven fan for driving air from said compartment toward the cotton plants whereby dirt may be separated from the cotton as it is picked, air inlets being provided to supply air to said driven fan and means extending to a suction device to pass air through said nozzle tube and against the fan which turns the same.

9. A cotton picker device having an inclosing casing provided with a concave end portion, a rotating tube mounted in said casing, the outer end of which is provided with an annular flange forming a picker head, a removable picker sleeve mounted in the end of said tube, said sleeve having picker teeth therein, a removable collar adapted to be mounted in the concave portion of said casing for facilitating the insertion of the device among the branches of the cotton plants, the casing also having air openings adjacent to said collar, and means carried by the rotating tube for forcing air through the said openings and blowing dirt away from the cotton.

10. A cotton picker device having a suction rotated picker tube, and an inclosing casing movably supporting said tube and having a broad concaved outer end portion adapted to direct the cotton toward the entrance end of the said picker tube, the end of the picker tube being provided with projections for loosening the cotton from its bolls.

11. A cotton picker device having a rotating picker tube, a casing inclosing the same and having a broad concaved outer surface, the end of said casing being provided with obliquely arranged air passages, and means carried by the picker tube for forcing air outwardly through said passages for preventing the accumulation of dirt upon the end of picker device and blowing the same from the cotton.

12. A cotton picker device comprising a suction driven nozzle adapted to receive cotton from its bolls and a damper mechanism for controlling the inlet of air and varying the speed with which the nozzle is driven.

13. A cotton picker comprising a rotating tube having a recess in its outer end, a removable sleeve mounted in said end, said sleeve being provided with picker teeth, the tube also having an outwardly extending annular end portion forming a cotton engaging face, a casing inclosing said tube and the outwardly extending annular portion and means for rotating the tube.

14. A cotton picker device comprising an inner rotatable tube, a fan for driving the same, a casing arranged to admit air to said fan, the outer end of said tube having an enlarged annular head portion and having an inner threaded recess, threaded picker sleeves adapted to be fitted in said recess, the casing fitting around the said annular head and having a threaded inner edge, and a removable collar adapted to engage said threaded edge and to coöperate with elongated picker sleeves in facilitating the insertion of the picker device among cotton plants.

In testimony whereof, I have hereunto set my hand, in presence of two witnesses.

J. HENRY C. BOIG.

Witnesses:
    CASSELL SEVERANCE,
    CHARLES C. MONTGOMERY.